Patented Jan. 9, 1934

1,942,723

UNITED STATES PATENT OFFICE 1,942,723

COMPOSITE PANEL AND METHOD OF PRODUCING THE SAME

Treadway B. Munroe and Elbert C. Lathrop, Chicago, Ill., assignors to The Celotex Company, Chicago, Ill., a corporation of Delaware No Drawing. Application June 29, 1929
Serial No. 374,945

4 Claims. (Cl. 154—2)

This invention relates to panels used in building construction and has for its object to provide a strong, rigid panel of pleasing appearance, substantially homogeneous throughout, having no tendency to crack or chip, as well as a panel less costly to manufacture and more efficient in use than those heretofore proposed.

With these and other objects in view the invention consists in the novel details of construction and combinations of parts constituting the article as well as in the novel steps and combinations of steps constituting the method by which the article is produced, all as will be more fully hereinafter described and particularly pointed out in the claims.

It is well known that wood panels of any appreciable size must be made up of relatively narrow sections or built up of laminations, the laminated form necessarily veneered in order that it may present a pleasing surface. Such panels, either those built up from solid strips or the laminated panels, have a tendency to split or crack due to the wood grain structure thereof. The proposed panel construction comprehends a dense homogeneous base portion comprising primarily a heterogeneous arrangement of fibrous material having a facing sheet of paper or other sheet material which may be printed or otherwise provided with an attractive surface effect. The facing sheet is impregnated with a synthetic resin and is secured to the base portion of the panel by a synthetic resin. A panel so made provides a moisture-proof surface which is not attacked by acid or alkali and has no tendency to split or crack.

The base portion of the panel is made from fibrated materials such as wood, corn stalks, sugar cane bagasse, fiber, or other suitable and similar material which has been digested and refined or prepared in an equivalent manner and formed into a wet lap or sheet having the usual water content of approximately fifty percent. This sheet is placed in a press with a surfacing sheet, that has been highly impregnated with resin, on one surface thereof. The press platens are then brought down on the material with a pressure of about 500 pounds per square inch while heat of approximately 300° Fahrenheit is applied thereto, and this pressure is maintained for about sixty minutes to produce what may be termed a "welding" of the elements of the composite panel. The heat is preferably applied through the platens, provision being made for the escape of steam either by corrugating the surface of one of the platens or interposing a screen between the material and one of the platens, all as readily understood by one skilled in this art.

This invention further contemplates the utilization of a preformed base portion of heterogeneously arranged fibers which is in the form of a hard, dense, homogeneous sheet without grain as a finished material to which the surfacing sheet is then applied. That is to say, one face, or both faces as desired, of this preformed base is given a heavy coat of synthetic resin varnish over which is applied one or more sheets of resin impregnated paper or other surfacing material according to the appreciable thickness desired of the finished surface. The panel so built up is then placed between platens and subjected to such temperature and pressure for such a time as found necessary to convert the synthetic resin to its stable and final insoluble form. The same pressure and heat above mentioned may be used in this case but the time element may be shortened since the moisture content of the material is greatly reduced.

Instead of the resin, other suitable adhesives may be used to secure the facing sheets to the base material. For example, a casein glue, silicate, or varnish may be found admirably suited for some panels, the varnish under application of heat and pressure being polymerized to bond the materials together.

The surfacing material, whether a sheet of paper, cotton, linen, or other appropriate and desired material, may be printed, lithographed, tinted, dyed or otherwise treated to provide a wood grain, marble or other pleasing effect. Such sheets so treated, and cemented with a transparent resin, produce a very good simulation of the surface of the material product.

It is obvious that those skilled in the art may vary the details of construction and arrangements of parts, as well as vary the steps of the method by which the article is produced without departing from the spirit of this invention, and therefore it is not desired to be limited to the foregoing disclosure except as may be demanded by the claims.

What is claimed is:—

1. The method of producing an attractive hard panel of fibrous composition which consists in combining a base portion of homogeneous but heterogeneously arranged fibers having a moisture content of approximately 50% with a surfacing sheet carrying a design thereon; and welding said base portion and said sheet together by virtue of an adhesive interposed therebetween, said welding accomplished under application of heat and pressure.

2. The method of producing a composite panel which consists in forming a base of heterogeneously arranged fibers having a moisture content of approximately 50%; applying to a surface of said base a sheet of fibrous material with adhesive therebetween; and subjecting the combined base and surfacing sheet to heat and pressure to form a dry, hard, dense, homogeneous, grainless surfaced panel.

3. The method of producing a composite panel having a hard, dense, homogeneous, grainless base of heterogeneously arranged fibers, and a moisture-proof surface wherein sheeted fiber base material, having a water content of approximately 50% and having applied to a face a sheet of fibrous material with resin, is subjected to heat and pressure to compact and to dry the moisture from the base material and to form a hard, dense and grainless structure while simultaneously polymerizing the resin to bind the surface sheet to the base, whereby in a single pressing operation there is produced a product comprising a hard, dense, grainless base material having adheredly secured to one face thereof a surfacing sheet by a polymerized synthetic resin.

4. The method of producing an attractive hard panel of fibrous composition, which consists in combining a base portion of homogeneous but heterogeneously arranged fibers having a moisture content of approximately 50%, with a resin impregnated surfacing sheet carrying a design thereon, said base portion formed into a dense grainless board and said surfacing sheet adheredly secured thereto, the base portion formed and the surfacing sheet adhered thereto through simultaneous subjection of the composition sheet to heat and pressure.

TREADWAY B. MUNROE.
ELBERT C. LATHROP.